(12) United States Patent
Granatelli et al.

(10) Patent No.: US 7,876,211 B2
(45) Date of Patent: Jan. 25, 2011

(54) APPARATUS AND METHOD FOR ALARM SUPPRESSION IN A MONITORING SYSTEM

(75) Inventors: David Granatelli, Lilyfield (AU); Craig Stuart Ashley, Lane Cove (AU); Chris Michael Gilbert, Wavell Heights (AU)

(73) Assignee: Honeywell International Inc., Morristown, NJ (US)

( * ) Notice: Subject to any disclaimer, the term of this patent is extended or adjusted under 35 U.S.C. 154(b) by 310 days.

(21) Appl. No.: 12/034,782

(22) Filed: Feb. 21, 2008

(65) Prior Publication Data

US 2009/0212936 A1 Aug. 27, 2009

(51) Int. Cl.
*G08B 29/00* (2006.01)
(52) U.S. Cl. .................. 340/506; 340/3.1; 340/825.36; 340/825.49
(58) Field of Classification Search .................. 340/506, 340/511, 3.1, 825.36, 825.49
See application file for complete search history.

(56) References Cited

U.S. PATENT DOCUMENTS 5,400,246 A * 3/1995 Wilson et al. .................. 700/17

5,581,242 A 12/1996 Arita et al.

FOREIGN PATENT DOCUMENTS

| JP | 11-085265 A | 3/1999 |
|----|-------------|--------|
| JP | 2000-200101 A | 7/2000 |
| JP | 2004-086338 A | 3/2004 |

OTHER PUBLICATIONS

Tord Bergquist et al., "Alarm Reduction in Industrial Process Control", Proceeding of the EFTA 2003, Portugal, 2003, 8 pages.

* cited by examiner

*Primary Examiner*—Daryl Pope
(74) *Attorney, Agent, or Firm*—Munck Carter, LLP

(57) ABSTRACT

A method, apparatus and system are provided that receive an alarm record and compare the alarm record to a suppression description that describes an alarm to be suppressed. A suppression flag of the received alarm record is set in accordance with a result of the comparison. A suppression trigger message may be received and compared to the suppression description. The suppression description may be enabled in accordance with the result of the suppression trigger message comparison and the alarm record compared to the suppression description only if the suppression description is enabled.

21 Claims, 2 Drawing Sheets

APPARATUS AND METHOD FOR ALARM SUPPRESSION IN A MONITORING SYSTEM

TECHNICAL FIELD

This disclosure relates generally to monitoring and control systems and more specifically to an apparatus and method for alarm suppression in a monitoring system.

BACKGROUND

Processing facilities are often managed using process control systems. Such systems provide control and monitoring functions to operators of the processing facilities. Example processing facilities include manufacturing plants, chemical plants, crude oil refineries, and ore processing plants. Among other operations, process control systems typically manage the use of motors, valves, and other industrial equipment in the processing facilities.

In conventional process control systems, device controllers are often used to monitor and/or control one or more processes. Such device controllers typically operate as part of a level of applications in a process control and monitoring system referred to as the 'control' level. The device controllers could, for example, monitor the operation of the industrial equipment, provide control signals to the industrial equipment, and generate alarms when malfunctions are detected or when measured process variables meet predefined criteria. Conventional process control systems are often responsible for monitoring and controlling numerous process variables, which generally represent characteristics of the process being monitored and controlled. Process variables typically include measurable process characteristics, as well as calculated values (which are often based on measurable process characteristics) used during process control.

Information relating to measurable process characteristics, controllable process characteristics, and the state of the process being controlled or monitored are displayed to human operators of the system. The operators are responsible for attending and responding to status and alarm displays generated by the process control systems.

SUMMARY

This disclosure provides an apparatus and method for suppression of alarms in a process monitoring and control system.

In a first embodiment, a method includes receiving an alarm record and comparing the alarm record to a suppression description that describes an alarm to suppress. The method also includes setting a suppression flag of the received alarm record in accordance with a result of the comparison.

In particular embodiments, the method includes receiving a suppression trigger message and comparing the suppression trigger message to the suppression description. In such embodiments, the method further includes enabling the suppression description in accordance with the result of the suppression trigger message comparison and comparing the alarm record to the suppression description only if the suppression description is enabled.

In a second embodiment, an apparatus includes an input and an alarm controller. The input receives an alarm record. The alarm controller compares the received alarm record to a suppression description describing an alarm to suppress and sets a suppression flag of the received alarm record in accordance with a result of the comparison.

In a third embodiment, a system includes an alarm controller and a device that sends an alarm record. The alarm controller receives the alarm record and compares it to a suppression description describing an alarm to suppress. The alarm controller further sets a suppression flag of the received alarm record in accordance with a result of the comparison.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
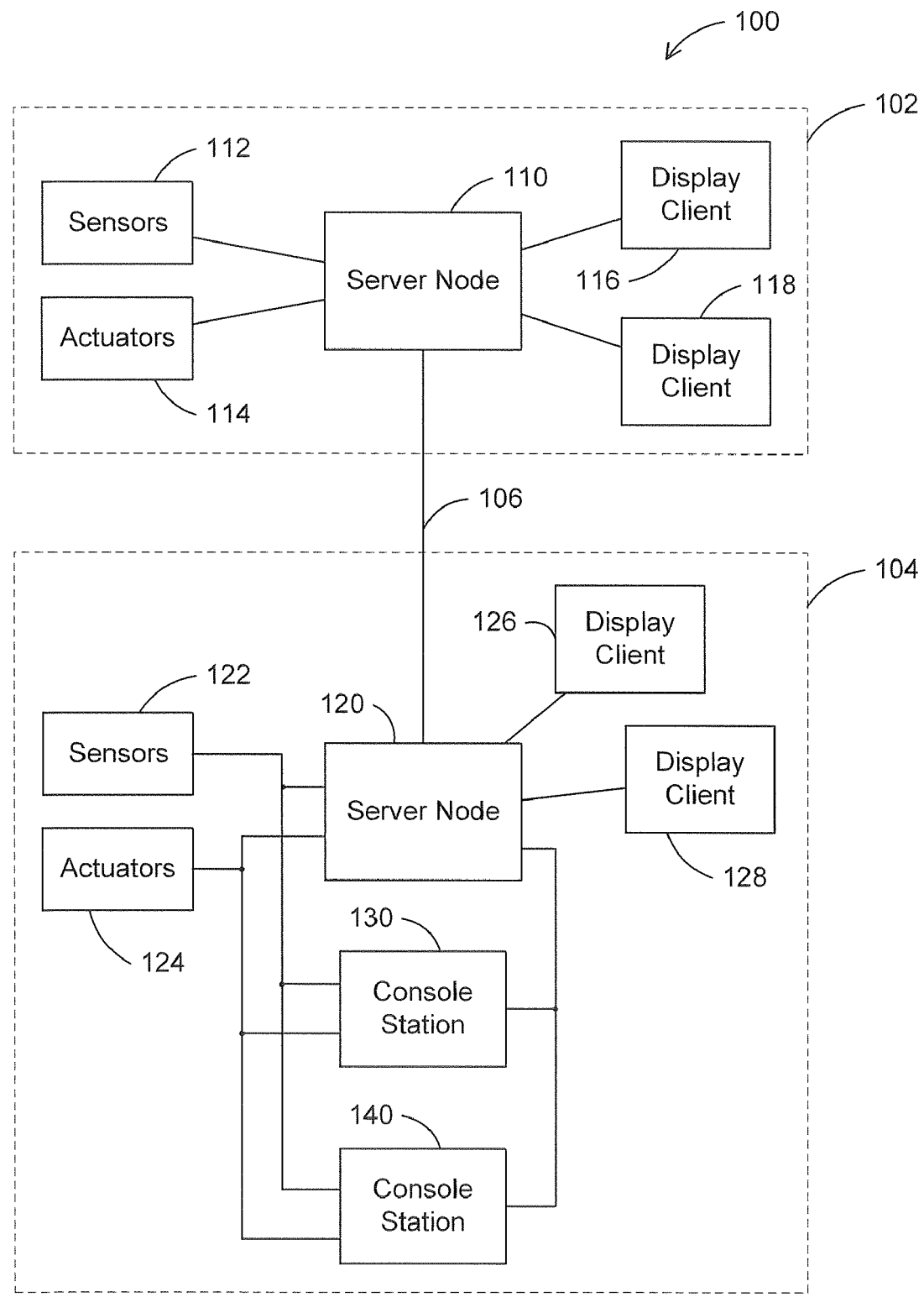
FIG. 1 is a schematic diagram of a process monitoring and control system.

FIG. 1 is a schematic diagram of a process monitoring and control system 100. The system 100 includes control clusters 102 and 104, which communicate via a communication link 106. The cluster 102 may be used to control or monitor one portion of a manufacturing plant, while the cluster 104 is used to control or monitor another portion of the plant.

The cluster 102 includes a server node 110, which is coupled to sensors 112, actuators 114, and display clients 116 and 118. The sensors 112 measure process variables or characteristics of the process being controlled or monitored by the cluster 102 and send the measured values to the server node 110. The sensors 112 may also receive alarm values from the server node 110, compare the measured values to the alarm values, and send an alarm message to the server node when a measured value reaches or exceeds an alarm value. Similarly, the sensors 112 may perform self-tests and send an alarm message to the server node 110 when a self test indicates a malfunction in a sensor or its associated circuitry. The actuators 114 receive commands from the server node 110 to open valves, run motors, or perform other actions that manipulate characteristics of the portion of the manufacturing plant under the control of the cluster 102. The actuators 114 may also perform self-tests and send an alarm message to the server node 110 when a self test indicates a malfunction in an actuator or its associated circuitry.

The server node 110 sends information to the display clients 116 and 118 for display to an operator responsible for monitoring or controlling the operation of the portion of the manufacturing plant. The information may include alarm messages received from the sensors 112 and/or the actuators 114. The operator may input commands to the server node 110, dispatch technicians to repair plant machinery, schedule maintenance, or make some other response to the information and alarm messages displayed on the display client 116 or 118.

The cluster 104 operates similarly to the cluster 102. Sensors 122 and actuators 124 are coupled to a server node 120 and, respectively, measure and control the portion of the manufacturing plant under the control of the cluster 104. Display clients 126 and 128 display information provided by the server node 120. The cluster 104 further includes console station 130 and console station 140. The console stations 130 and 140 include displays and input devices. In this way, the cluster 104 may support four operators, one each at the display clients 126 and 128 and the console stations 130 and 140.

The console stations 130 and 140 also provide data processing capability and are coupled to the sensors 122 and the actuators 124. Monitoring and control applications may run on the server node 120 or either of the console stations 130 and 140, as required by the operators using the display clients 126 and 128 and the console stations 130 and 140.

Process control and monitoring information, including alarm messages, may be sent between the clusters 102 and 104 via the communication link 106. Alarm messages that originate in the sensors 122 or the actuators 124 may be processed by an application running on the server node 130 before being sent to the server node 110 for display on one or both of the display clients 116 and 118. Similarly, an alarm message originating in the sensors 112, the actuators 114, or an application running on the server node 110 may be sent to the server node 120 and, possibly, thereon to the console stations 130 and 140. Alarms that the console stations 130 and 140 process, originate, or display are typically not communicated to the server node 120 or sent over the communication link 106.

Figure 2:
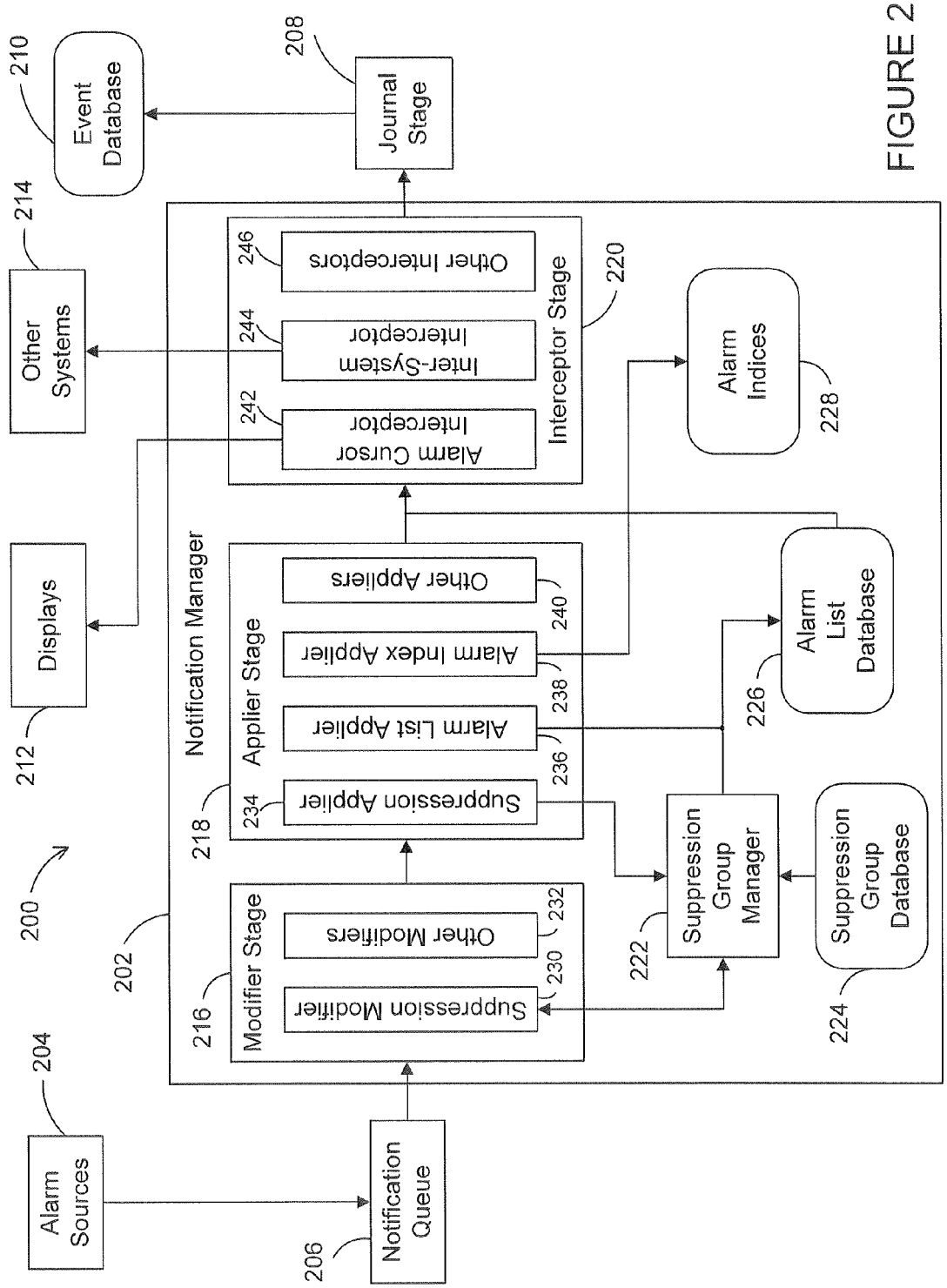
FIG. 2 is a schematic diagram of an alarm suppression system in accordance with this disclosure.

FIG. 2 is a schematic diagram of an alarm suppression system 200 in accordance with this disclosure. The alarm suppression system 200 operates to prevent the presentation of suppressed alarms in existing operator displays of a monitoring and control system. However, the alarm suppression system 200 may also provide new displays that show only suppressed alarms.

The system 200 may execute on a server node or a console station of the monitoring and control system of FIG. 1. A process monitoring and/or control application executing on a server node or a console station includes a notification manager 202 that filters, prioritizes and controls the display of system information to operators of the system. The notification manager 202 operates as part of a level of applications in a process control and monitoring system typically referred to as a 'supervisory' level.

A notification queue 206 receives alarm messages from alarm sources 204. The notification manager 202, operating as an alarm controller, takes the alarm messages from the notification queue 206 and processes them. After processing, all alarm messages are passed to a journal stage 208 for archival storage in an event database 210 along with event records from other portions of the process control system, to provide a history of the process control system's operation. Information regarding received alarm messages may be sent to displays 212 for presentation to operators of the process control and monitoring system. Information regarding received alarm messages may also or alternatively be sent to other systems 214, including other clusters, server nodes, or console stations.

The alarm sources 204 may include sensors, actuators and other clusters, server nodes, or console stations. Sensors and actuators controlled by programmable logic controllers have little onboard processing power and are typically coupled to a field device server. The field device server provides a high-level interface to the process control system, including sensing pre-programmed or programmable alarm conditions and generating alarm messages for the notification queue 206. Other sensors and actuators have more onboard processing capability and are able to generate their own alarm messages for the notification queue 206.

The notification manager 202 removes an alarm message from the notification queue 206 and passes the alarm message to a modifier stage 216. The alarm message includes an alarm record that identifies the alarm. The alarm record includes:

Point identifier: indicating the sensor, actuator or other field device that originated the alarm;

Parameter: indicating the characteristic of the point for which an alarm condition has occurred; and Condition: the alarm condition that has occurred (such as parameter value too high, too low, etc.).

The alarm record also indicates, when appropriate, that the alarm condition has been cleared. The alarm record may also include fields for other indicia identifying the alarm and/or other information associated with the alarm. It will be understood that an alarm message may also indicate that an alarm condition has ceased-for example, that the parameter value no longer meets the alarm criterion.

Absent the alarm suppression method of the present disclosure, described below, the notification manager 202 stores a received alarm record in an alarm list database 226. Each alarm in the alarm list database 226 is identified by, and may be accessed by, an index. Operators at the displays 212 may identify alarms they wish to have displayed by criteria such as physical location, type of equipment, alarm condition, and others. As the operators identify these display criteria, and as the alarm suppression system 200 receives alarms, the notification manager 202 creates and maintains in an alarm indices database 228 lists of indices that match the criteria each operator has specified. As the notification manager 202 receives alarm messages indicating that alarm conditions no longer exist, it removes alarm records from the alarm list database 226 and their associated indices from the alarm indices database 228.

According to the alarm suppression method of the present disclosure, the modifier stage 216 includes a suppression modifier 230 and may include other modifiers 232 for processing the alarm record. The suppression modifier 220 passes an alarm record received from the notification queue 206 to a suppression group manager 222, which compares the alarm to suppression group descriptions in a suppression group database 224. Based upon the results of the comparison, the suppression group manager 222 determines whether the alarm is to be suppressed. If so, the suppression group manager 222 signals the suppression modifier 230 to modify the alarm record to indicate that the alarm is suppressed, for example by setting a 'suppression' flag in the alarm record. Regardless of whether the suppression flag in an alarm record has been set, the modifier stage next passes the alarm record to an applier stage 218.

A suppression group description in the suppression group database 224 may describe a single alarm-identifying it by point, parameter, condition, and other characteristics. More likely, however, is that a suppression group description will identify a group of possible alarms. A suppression group may suppress all alarms from a particular point (e.g., a point associated with a machine that is having maintenance work performed), or all alarms reflecting a particular condition (e.g., temperature too low). It will be understood that a suppression group may alternatively or additionally identify a group by any number and grouping of alarm identifying indicia.

A suppression group description in the suppression group database 224 may include an 'active' flag, indicating to the suppression group manager 222 whether the suppression group description is to be used in suppressing received alarms. If the active flag of a suppression group description is not set, the suppression group manager 222 does not check a received alarm against that suppression group description.

The notification manager also receives suppression trigger messages from the alarm sources 204, via the notification queue 206. A suppression trigger may be a message from a field device server or other monitoring and control system indicating a system-wide status that requires a group of alarms to be suppressed. A suppression trigger may be a predetermined alarm message whose occurrence indicates that a group of other alarms should be suppressed.

A suppression applier 234 in the applier stage 218 recognizes a suppression trigger and passes it to the suppression group manager 222. The suppression group manager 222 uses the suppression trigger to activate or deactivate one or more suppression group descriptions in the suppression group database 224. The suppression group manager 222 also examines the alarms in the alarm list database 226 and, based upon whether a suppression group has been activated or deactivated, respectively sets or clears the suppression flags of associated alarms.

An alarm list applier 236 in the applier stage 218 receives the alarm record and stores it in the alarm list database 226, associating an index with the alarm record. An alarm index applier 238 in the applier stage 218 receives the alarm record and adds or removes its associated index to the alarm indices database 228.

An interceptor stage 220 includes an alarm cursor interceptor 242, an inter-system interceptor 244 and other interceptors 246. The alarm cursor interceptor 242 prepares display information to send to an operator display 212, according to reception of an alarm record, suppression of an alarm in the alarm list database 226 and in the alarm indices database 228, and according to information regarding the type of display or the subset of the alarm indices being displayed. Unless specifically requested, suppressed alarms are not included in display information to send to the operator display 212. However, the alarm cursor interceptor 242 may alternatively select from the alarm list database 226 only suppressed alarms for display, if so requested by an operator of a display 212. The inter-system interceptor 244 receives an alarm record and sends it to other monitor and control systems 214 for possible display on those systems.

The above description and its associated figures have described and illustrated various aspects of one particular implementation of the alarm suppression system 200. Other embodiments of the alarm suppression system 200 could be used without departing from the scope of this disclosure.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of media.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving a suppression trigger message;
   comparing the suppression trigger message to a suppression description an alarm to be suppressed;
   enabling the suppression description in accordance with a result of the comparison of the suppression trigger message to the suppression description;
   receiving an alarm record at an alarm controller; and
   if the suppression description is enabled, comparing the received alarm record to the suppression description and settings a suppression flag of the received alarm record in accordance with a result of the comparison of the received alarm record to the suppression description.

2. The method of claim 1, wherein the suppression description comprises a description of a group of alarms to be suppressed.

3. The method of claim 1, further comprising, after setting the suppression flag of the received alarm record, sending a message comprising the received alarm record.

4. The method of claim 1, wherein the suppression trigger message comprises a message from a control system indicating a system-wide status that requires a group of alarms to be suppressed.

5. The method of claim 1, further comprising:
   storing the received alarm record;
   wherein comparing the received alarm record to the suppression description comprises comparing the suppression description to the stored alarm record in response to enabling the suppression description.

6. The method of claim 5, further comprising removing the stored alarm record from a display of stored alarm records in accordance with the result of the comparison of the received alarm record to the enabled suppression description.

7. The method of claim 5, further comprising:
   storing a plurality of received alarm records;
   storing an index for each of the stored alarm records; and
   deleting the stored index for one of the stored alarm records in accordance with the result of the comparison of the stored alarm record to the enabled suppression description.

8. An apparatus comprising:
   an input operable to receive a suppression trigger message and an alarm record; and
   an alarm controller operable to:
      compare the suppression trigger message to a suppression description describing an alarm to be suppressed;

enable the suppression description in accordance with a result of the comparison of the suppression trigger message to the suppression description; and if the suppression description is enabled, compare the received alarm record to the suppression description and set a suppression flag of the received alarm record in accordance with a result of the comparison of the received alarm record to the suppression description.

9. The apparatus of claim 8, wherein the suppression description comprises a description of a group of alarms to be suppressed.

10. The apparatus of claim 8, wherein the alarm controller is further operable, after setting the suppression flag of the received alarm record, to send a message comprising the received alarm record.

11. The apparatus of claim 8, wherein the alarm record includes:
   a point identifier identifying a device originating an alarm that might be suppressed;
   a parameter identifying a characteristic of the device associated with the alarm that might be suppressed; and
   an alarm condition identifying a condition of the device.

12. The apparatus of claim 8, wherein the alarm controller is operable to:
   store the received alarm record; and
   compare the enabled suppression description to the stored alarm record in response to enabling the suppression description.

13. The apparatus of claim 12, wherein the alarm controller is further operable to remove the stored alarm record from a display of stored alarm records in accordance with the result of the comparison of the received alarm record to the enabled suppression description.

14. The apparatus of claim 12, wherein the alarm controller is further operable to:
   store a plurality of received alarm records;
   store an index for each of the stored alarm records; and
   delete the stored index for one of the stored alarm records in accordance with the result of the comparison of the stored alarm record to the enabled suppression description.

15. A system comprising:
   a device operable to send an alarm record; and
   an alarm controller operable to:
      receive a suppression trigger message;
      compare the suppression trigger message to a suppression description describing an alarm to be suppressed;
      enable the suppression description in accordance with a result of the comparison of the suppression trigger message to the suppression description;
      receive the alarm record; and
      if the suppression description is enabled, compare the received alarm record to the suppression description and set a suppression flag of the received alarm record in accordance with a result of the comparison of the received alarm record to the suppression description.

16. The system of claim 15, wherein the suppression description comprises a description of a group of alarm records to be suppressed.

17. The system of claim 15, wherein the alarm controller is further operable, after setting the suppression flag of the received alarm record, to send a message comprising the received alarm record.

18. The system of claim 15, wherein the alarm controller is operable to provide the alarm record with the set suppression flag to a database for storage.

19. The system of claim 15, wherein the alarm controller is operable to:
   store the received alarm record; and
   compare the enabled suppression description to the stored alarm record in response to enabling the suppression description.

20. The system of claim 19, wherein the alarm controller is further operable to remove the stored alarm record from a display of stored alarm records in accordance with the result of the comparison of the received alarm record to the enabled suppression description.

21. The system of claim 19, wherein the alarm controller is further operable to:
   store a plurality of received alarm records;
   store an index for each of the stored alarm records; and
   delete the stored index for one of the stored alarm records in accordance with the result of the comparison of the stored alarm record to the enabled suppression description.

* * * * *